May 21, 1968     W. KAHANE     3,384,296

SEALING OF HORIZONTALLY-SPLIT CENTRIFUGAL COMPRESSORS

Filed May 19, 1967     2 Sheets-Sheet 1

Wilhelm Kahane

May 21, 1968   W. KAHANE   3,384,296
SEALING OF HORIZONTALLY-SPLIT CENTRIFUGAL COMPRESSORS
Filed May 19, 1967                      2 Sheets-Sheet 2

Wilhelm Kahane

United States Patent Office 3,384,296
Patented May 21, 1968

3,384,296
SEALING OF HORIZONTALLY-SPLIT
CENTRIFUGAL COMPRESSORS
Wilhelm Kahane, The Franconia, 20 W. 72nd St.,
New York, N.Y. 10023
Continuation-in-part of application Ser. No. 630,933,
Apr. 14, 1967. This application May 19, 1967, Ser.
No. 639,764
1 Claim. (Cl. 230—133)

ABSTRACT OF THE DISCLOSURE

A sealing is described for horizontally-split casings of centrifugal compressors. The interface of the flanged joint of the casing contains injection grooves into which a seal-liquid is injected under a pressure higher than that of the compressed gas. Said interface also contains drain grooves running between said injection grooves and its outer contour to prevent losses of the seal-liquid across the joint. Both sets of grooves are connected to the hydraulic-type shaft-sealing system of the compressor. The injection grooves communicate with the high pressure end of the shaft-sealing system and, being filled with seal liquid under a pressure in excess of that of the compressor pressure chamber, constitute a positive barrier against gas leakages. The drain grooves communicate with the low pressure end of that shaft-sealing system and prevent escape of seal-liquid from the interface into the atmosphere around the casing.

Horizontally-split casings, provided with this sealing, can be allowed the same maximum working pressure in the compression of highly hazardous hydrogen-rich gases as in the compression of air.

---

This invention is a continuation-in-part of that which was disclosed in my application Ser. No. 630,933 of Apr. 14, 1967, concerning the sealing against gas leakages through the joint made by the two flange-bolted halves of the casing of horizontally-split centrifugal compressors. The present invention consists in the provision of the interface of that joint with a groove system that receives a seal liquid under a pressure that is higher than that of the discharge pressure of the gas being compressed, said liquid and its pressure being taken from the shaft sealing system. That grooving system contains two channels that act as barriers, one against the entrance of gas leaks from the compressor's pressure chamber into the joint, the other one against the entrance of seal liquid leakages from the joint into the ambient atmosphere around the compressor.

Figure 1:
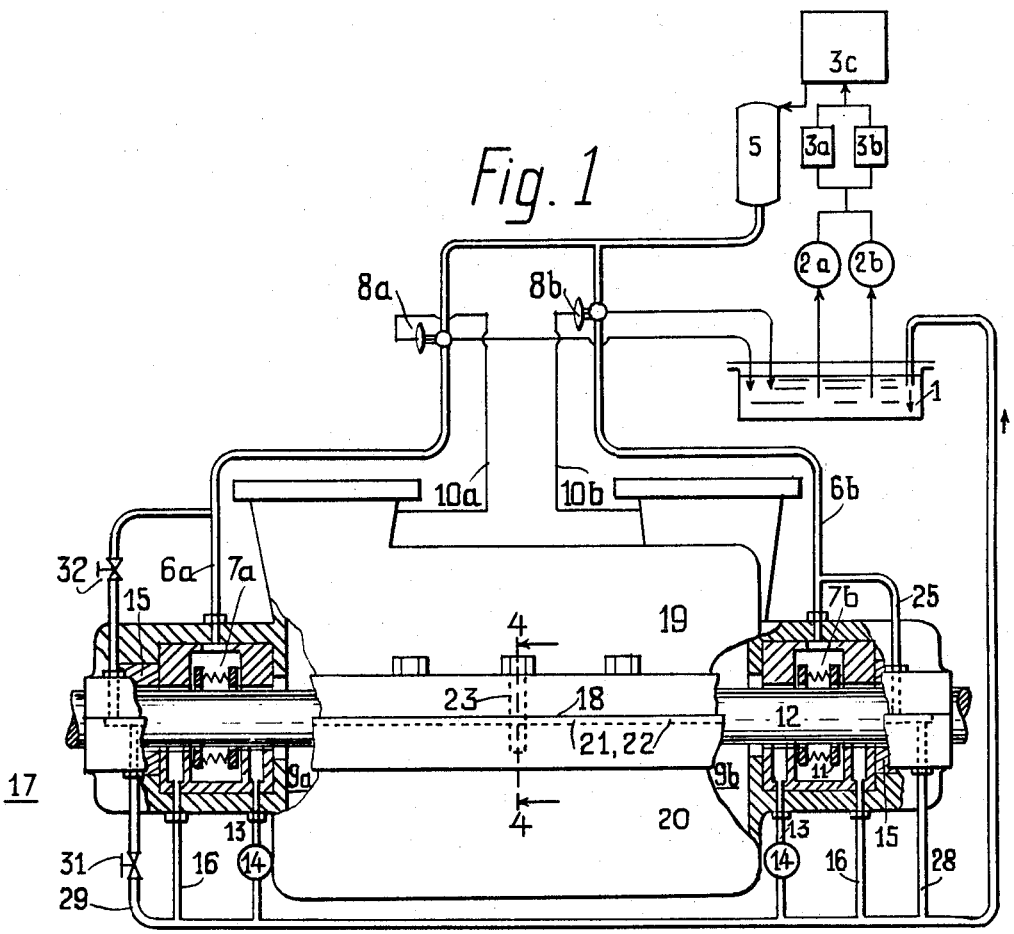
FIG. 1 is an elevational schematic, partly sectional view of a horizontally-split centrifugal compressor provided with the invented device.

In horizontally-split casings, comprising a flange-bolted joint and handling toxic, or highly hazardous, or low molecular weight gases, the maximum admissible working pressure is controlled by the maximum acceptable rate of gas leakages through the joint into the ambient atmosphere around the compressor rather than by the wall strength of the vessel. This is why one and the same horizontally-split centrifugal compressor casing which, as an example, is rated at 800 p.s.i. when used in the compression of air, cannot be permitted more than 300 p.s.i. if the gas to be compressed contains an important amount of hydrogen. This is so because hydrogen presents a great fire and explosion hazard and because, due to its low molecular weight, it has a high diffusivity through the sealing imperfections of the joint. In the above example where, in the present status of the art, hydrogen-rich gases are to be compressed at 800 p.s.i. in a horizontally-split casing, the above mentioned loss in the casing's maximum working pressure has the following unfavorable consequences. First, the compression of hydrogen-rich gases at 800 p.s.i. can no longer be done in the large size (inside diameter) casings that were admissible for the compression of air, but only in smaller size ones, whose basic much higher maximum working pressure for air was high enough to still withstand 800 p.s.i. when compressing hydrogen-rich gases. Therefore, in the present status of the art, instead of using one single high-capacity unit compressor manufacturers are compelled, in the conditions of that example, to connect in parallel two or more units of a smaller size. The drawbacks of this arrangement are a higher occupied floor space and higher investment costs. Besides, for any given compressor type, the smaller the size (inside diameter) the lower the hydraulic efficiency of the compression and the higher the horsepower consumption. Permanent tightness of the joint is more difficult to achieve in horizontally-split than in vertically-split barrel type centrifugal compressors, because of the pressure and temperature increasing along the joint from the suction to the discharge end, and because the temperature and pressure departures in time from the normal may vary greatly along that joint. This is why, in the compression of hydrogen-rich or other low molecular weight gases, vertically-split compressors have replaced the horizontally-split ones despite a much higher cost, lower maximum capacities (with the result of a lower hydraulic efficiency and a higher consumption of power) and a larger occupied floor space.

All attempts done in the past to increase the permanence of the tightness of the joint of horizontally-split casings by means of gaskets have proved unsuccessful and even dangerous, so that now only a metal-to-metal contact is acceptable in the joint of the two halves of a horizontally-split centrifugal compressor casing. I concluded that, in order to eliminate hazards while still being able to use, in the compression of hydrogen-rich or other dangerous gases, the same large size casings at their full maximum working pressure as in the compression of air, a fluid over-pressure or under-pressure barrier for leakages is needed in the joint. Such a barrier can be created by using hydrodynamic means existing in the shaft-sealing system of the compressor. In the invention disclosed with my application Ser. No. 630,933, I proposed as a solution to that problem the under-pressure barrier resulting from the slight vacuum created in a vent channel of the joint in communication with the compressor's bearing isolation chambers, that are a part of the shaft-sealing system and are kept under a slight vacuum. The fluid pressure barrier proposed in the present specification is that of a seal liquid injected into a groove, in the interface of the joint, at a pressure in excess of the discharge pressure of the gas being compressed. A distinctive feature of the invention is that the seal liquid and its pressure are taken from the shaft-sealing system of the compressor. Another feature is the provision of a second barrier, this latter one for the prevention of seal liquid leakages to the atmosphere around the casing.

Injection of a seal liquid in the interface of joints has been used in other pressure vessels but never before in the joint of horizontally-split casings of centrifugal compressors, in spite that such a use, as described in the present specification, would have since long solved the problem of boosting the maximum working pressure of large size horizontally-split compressors, when compressing hazardous low molecular weight gases, up to that which is admissible in the compression of air. The stringency of that problem, which is more than 30 years old, resulted from the ever increasing proportion of compressors for hydrogen-rich gases (used in the synthesis of ammonia for fertilizers, in that of gaseous compounds for the plastics industry, and for the upgrading of lubricating oils and other crude oil fractions through hydrogenation) as compared to those handling other gases. What gives practical value to this invention is the combination of the injection of a seal liquid in the casing's joint with the use of means already existing in the shaft-sealing system of the compressor.

Most present centrifugal compressors, no matter whether horizontally- or vertically-split, that handle dangerous or low molecular weight gases, are provided with a hydraulic-type shaft-sealing system. The liquid ordinarily employed in these sealings is either lubricating oil or water. Other liquids are used when the quality of the gas or that of the seal liquid might be impaired through their contact under pressure. A typical hydraulic shaft-sealing system, currently used today in centrifugal compressors handling toxic or hazardous or low molecular weight gases, comprises the following items represented schematically in FIG. 1, which is an elevational schematic, partly sectional, view of a horizontally-split centrifugal compressor provided with the invented device. A reservoir 1 for the circulation of the seal liquid contains the suction pipes of the main seal pump 2a and auxiliary seal pump 2b. They use two different kinds of motive power and are automatically switchable. The seal liquid is pumped through interchangeable filters 3a and 3b, cooler 3c and overhead seal liquid tank 5 to the injection lines 6a and 6b into the compressor's shaft-seals 7a and 7b. Differential-pressure regulators 8a and 8b, actuated respectively by the gas suction and discharge pressures, maintain in the injection lines 6a and 6b a constant excess pressure over the gas pressure in the spaces 9a and 9b of the gas pressure chambers adjacent to the shaft-seals 7a and 7b. To this effect the regulator 8a, that controls the injection into the line 6a to the shaft-seal 7a that is located at the gas suction end of the compressor, is connected to the compressor's gas suction through line 10a; while the regulator 8b, that controls the seal liquid pressure in the injection line 6b to the shaft-seal 7b that is located at the gas discharge end of the compressor, is actuated by the compressor's discharge pressure through line 10b. Positive shaft-sealing is accomplished following the injection of seal liquid between two stationary floating rings 11 at a pressure slightly above that of the gas in the pressure chambers 9a and 9b to be sealed. The excess pressure of the seal liquid over that of the gas prevents gas leakage past seal rings 11. Seal liquid flows between the sealing rings 11 and the shaft 12, both toward the gas pressure chambers 9a and 9b and then back to the pump through the internal drains 13, which comprise gas separators 14, and toward the shaft bearings 15 and then back to the pump through the external drains 16. Both seal leakages, that which goes into the gas streams of chambers 9a and 9b as well as that which flows toward the shaft-bearings 15 in contact with the atmosphere 17, are minimized ordinarily by dry seals of the labyrinth type, not shown. The seal liquid, which is recovered through the drains 13 and 16, is returned to the reservoir 1 and recirculated indefinitely. The losses through the seals are very small and occur mostly into the gas stream. When the seal liquid used is lubricating oil, the oil from drain 16 is used quite often to lubricate the shaft bearings 15. In most applications, the above described hydraulic shaft-sealing system is built in a console as an aggregate together with the necessary automatic switches for pumps and controls, including those for positive sealing during shut-down periods.

Figure 2:
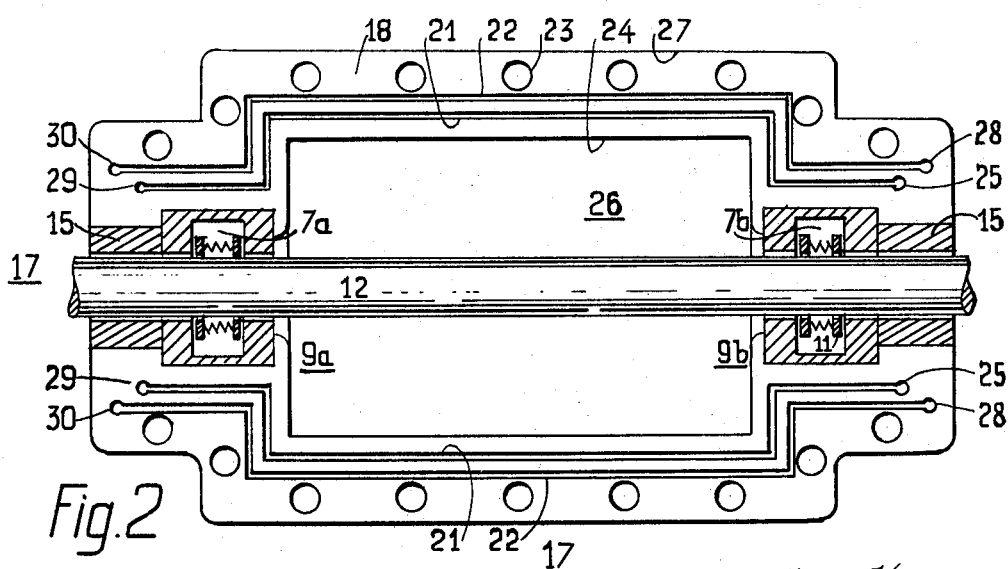
FIG. 2 is a plan view of one of the two halves of the compressor casing, showing the interface of the joint made by the two flange-bolted halves of that casing.

FIG. 2 is a plan view of one of the two halves of the compressor casing, showing the interface 18 of the joint made by the two flange-bolted halves 19 and 20 of the compressor shown in FIG. 1. For a better comprehensible description, the example considered in FIGS. 1 and 2 is that of a compressor with two open shaft ends.

The present invention consists in the provision of the horizontal interface 18 of the joint, made by the two flange-bolted halves 19 and 20 of horizontally-split casings for centrifugal compressors, with a groove system consisting of narrow channels 21 and 22 in that interface, cut in the metal of one of said halves. These channels act as positive barriers against leakages. Their general direction is that of the center-line of the row of bolt-holes 23. The injection channels 21 run in said interface between its inner edge 24, that bordering with the compressor's pressure room 26, and the row of bolt-holes 23, at a safe distance from both. These injection channels 21 are connected, by means of two lines 25, to the previously mentioned injection line 6b, that supplies with seal liquid that shaft-seal 7b, which is located at the gas discharge end of the compressor. Said supply of seal liquid is done under the pressure existing in line 6b, which exceeds the gas discharge pressure by a constant amount as controlled by the previously mentioned differential-pressure regulator 8b. The seal liquid injected into channel 21 is either stationary or, if so desired in order to avoid clogging of that channel, under a very slight motion. Its pressure, all along its length, being higher than that of the gas in any point of the compressor's pressure room 26, no gas from that room can leak into the interface of the joint toward channel 21 and then further to the ambient atmosphere 17 around the compressor. It follows therefore that said injection channel 21 forms an over-pressure barrier against the entrance of gas from the compressor's pressure room into the interface of the casing's joint.

Figure 3:
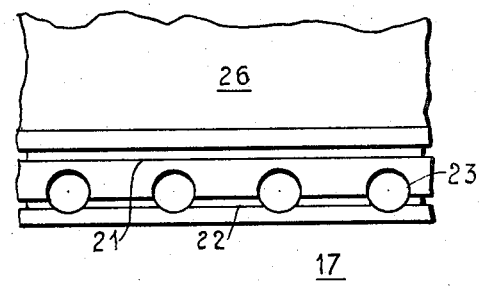
FIG. 3 is an enlarged cut-away plan view of the interface shown in FIG. 2, and represents an alternate arrangement of the grooves.
Figure 4:
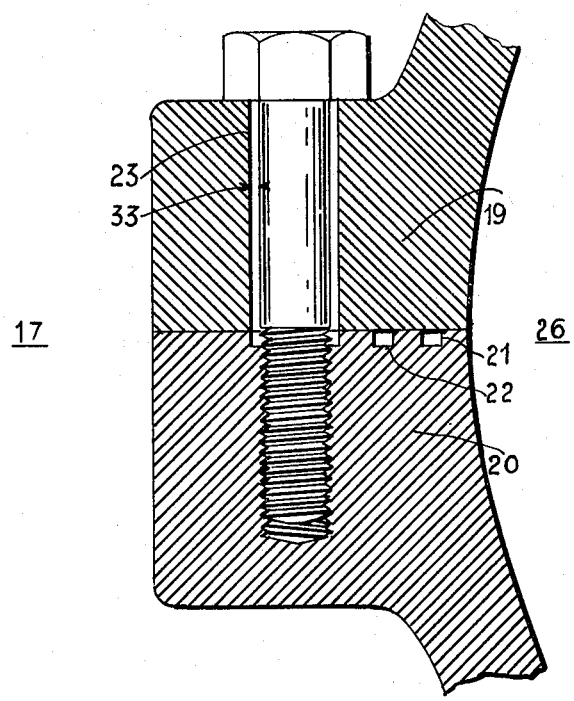
FIG. 4 is a cross-sectional view of the compressor casing along the vertical plan 4—4 of FIG. 1.

But, because of the high pressure of the seal liquid in the injection channel 21, the imperfections of the metal-to-metal sealing of the joint may cause minute leakages of seal liquid from channel 21 across the outside contour 27 of said interface or through the clearance space 33 along the bolts in bolt-holes 23 to the ambient atmosphere 17 around the compressor. For this reason the system of grooves of the interface 18 includes drain channels 22, whose general direction is the same as that of the injection channels 21, namely that of the row of bolts 23. These drain channels 22 are located between the injection channels 21 and the outer contour 27 of the interface. As to the position of channels 21 and 22 with regard to the row of bolt-holes 23, it is to be noted that the drain channels 22 may run either between an injection channel 21 and the row of bolt-holes, as shown in the example represented in FIG. 2, or as in the alternate grooving arrangement represented in FIG. 3, it may intersect the bolt-holes. But no bolt-hole is permitted between an injection channel 21 and a drain channel 22, unless intersected by the latter. The drain channels 22 are connected by means of lines 28 to the seal liquid drain line of the previously described hydraulic shaft-sealing system. The path of any possible drop of seal liquid that might leak from an injection channel 21 toward the ambient atmosphere 17 around the compressor, either directly through the outer contour 27 of the interface 18 or via a bolt-hole, would be barred by a draining channel 22. Thus no seal liquid can be lost to the atmosphere. It follows that said drain grooves might be viewed as forming an under-pressure barrier (as the suction pressure of the pumps is in general lower than the atmospheric pressure) against the entrance of seal liquid leakages from the injection grooves of the interface into the ambient atmosphere. FIG. 4 is a cross-sectional view through the casing joint along a vertical plan marked 4—4 in FIG. 1. It shows the positions of the injection channel 21 and drain channel 22 when the latter runs between the injection channel and the row of bolt-holes 23, as in the alternate represented in FIG. 2.

In present horizontally-split compressor casings, a very slight imperfection in the tightness of the joint may cause a dangerous loss of gas, the more so when that gas contains an important amount of hydrogen. But, because the motion of liquids through leaks is incomparably more restricted than that of gases, that slight imperfection would cause, in casings protected by the invented device, at the very most only a very small loss of seal liquid into the gas stream and no loss at all to the atmosphere. That loss into the gas stream will be by far smaller than that which now flows into the gas stream from around the shaft in the best possible shaft-seal because, while the stationary and the moving parts of the latter can be pressed together only gently, the two halves of the casing are pressed together very strongly by bolts.

The invented casing seal adds practically no power load and no additional investment in auxiliary equipment to those of the already existing shaft-seal system of the compressor.

In order to prevent a possible clogging of channels 21 and 22 for lack of circulation therein, by-pass lines 29 and 30, provided with valves, might be added. In normal operation, valve 31 on by-pass 29, that short-circuits an injection channel 21 to the drain of the shaft-seal system to reservoir 1, is closed. It may be opened slightly for short periods of time to prevent deposition of clogging material in channel 21. In normal operation, also valve 32 on by-pass line 30, that allows a positive flow of seal liquid through drain channel 22 to its drain line 28, is closed, but may be opened slightly for short periods of time to prevent deposition of clogging materials in channel 22.

Summing up, the invented device is a combination of the following three elements: (1) a flange-bolted, horizontally-split casing for centrifugal compressors; (2) a system of grooves in its joint; and (3) the connection of that system of grooves to the shaft-sealing system of the compressor. When provided with this device, horizontally-split centrifugal compressors acquire the same maximum admissible working pressure for the compression of hydrogen-rich gases as for the compression of air. Its application in large-capacity compression plants for hydrogen-rich gases frees the user from the need, that exists in the present status of the art, of employing either a larger number of smaller units, instead of a single large horizontally-split unit, or employing a vertically-split barrel type compressor, both present alternatives imposing an unnecessary increase in capital investment and consumption of power. Because of that combination of elements, this result has been obtained without introducing any complication and cost, by simply connecting the casing-sealing system to the existing shaft-sealing one.

What I claim as new is:

1. In a centrifugal compressor provided with a hydraulic shaft-sealing system, operated with a seal liquid that is recirculated by a pump between its high-pressure end, which is connected to the discharge of that pump, and whose pressure is in excess of the gas discharge pressure, and the low pressure end of that shaft-sealing system, which is connected to the suction end of the pump;

a horizontally-split casing made of two flange-bolted halves pressed together by a row of bolts against the interface of the mutual metal-to-metal contact of the joint of said two halves, in combination with:

(a) seal liquid injection grooves, in that interface, with their general direction following that of the row of bolts, said injection grooves containing seal liquid under a pressure in excess of the gas discharge pressure; said injection grooves being located between the bolt holes and the inner contour of said interface; the injection grooves thus forming an over-pressure barrier against the entrance of gas from the pressure chamber of the compressor into the interface of the casing joint;

(b) seal liquid drain grooves in said interface, with their general direction following that of the row of bolts, and leading outside of said interface, where they drain the leakages coming into them from the above described injection grooves; these drain grooves being located between said injection grooves and the outer contour of the interface; said drain grooves thus forming a barrier against the entrance of seal liquid leakages from the above described injection grooves of the interface into the atmosphere around the casing;

(c) communications between the seal-liquid injection grooves and the high-pressure end of the hydraulic shaft-sealing system of the compressor, whereby said injection grooves receive from that shaft-sealing system seal liquid under the above mentioned pressure in excess of the gas discharge pressure of the compressor;

(d) communications between the seal-liquid drain grooves and the low pressure end of the hydraulic shaft-sealing system of the compressor, whereby said drain grooves drain into that shaft-sealing system the leakages of seal-liquid escaped from the injection grooves into them.

References Cited

UNITED STATES PATENTS

| | | | |
|---|---|---|---|
| 1,058,936 | 4/1913 | Bancel | 253—39 |
| 1,607,234 | 11/1926 | Brown | 230—205 |
| 2,590,803 | 3/1952 | Unger et al. | 220—46 |
| 3,055,538 | 9/1962 | Schoessow | 220—46 |
| 3,144,035 | 8/1964 | Hablanian et al. | 277—1 |

HENRY F. RADUAZO, *Primary Examiner.*